United States Patent
Hiramatsu

(10) Patent No.: US 8,470,430 B2
(45) Date of Patent: Jun. 25, 2013

(54) HONEYCOMB STRUCTURE AND METHOD FOR MANUFACTURING THE SAME

(75) Inventor: Takuya Hiramatsu, Nagoya (JP)

(73) Assignee: NGK Insulators, Inc., Nagoya (JP)

( * ) Notice: Subject to any disclaimer, the term of this patent is extended or adjusted under 35 U.S.C. 154(b) by 841 days.

(21) Appl. No.: 12/490,030

(22) Filed: Jun. 23, 2009

(65) Prior Publication Data

US 2009/0274867 A1    Nov. 5, 2009

Related U.S. Application Data

(63) Continuation of application No. PCT/JP2007/075038, filed on Dec. 26, 2007.

(30) Foreign Application Priority Data

Dec. 27, 2006  (JP) ............................... 2006-352733
Sep. 3, 2007   (JP) ............................... 2007-228053

(51) Int. Cl.
*B01D 39/20*   (2006.01)
*F01N 3/022*   (2006.01)
*C04B 41/50*   (2006.01)
*B28B 3/20*    (2006.01)

(52) U.S. Cl.
USPC ................. 428/116; 428/117; 55/523; 55/524

(58) Field of Classification Search
USPC ................ 428/116–118; 55/282.3, 522–524; 422/169–172, 177–182; 156/89.22
See application file for complete search history.

(56) References Cited

U.S. PATENT DOCUMENTS

| | | | |
|---|---|---|---|
| 6,508,852 B1 * | 1/2003 | Hickman et al. | 55/523 |
| 6,544,310 B2 * | 4/2003 | Badeau et al. | 55/385.3 |
| 7,138,003 B2 | 11/2006 | Ichikawa et al. | |
| 7,179,516 B2 | 2/2007 | Ichikawa | |
| 2004/0142145 A1 | 7/2004 | Hashimoto et al. | |
| 2004/0177600 A1 | 9/2004 | Ichikawa et al. | |
| 2004/0244344 A1 * | 12/2004 | Ichikawa | 55/523 |
| 2005/0102987 A1 * | 5/2005 | Kudo | 55/523 |
| 2007/0065350 A1 * | 3/2007 | Maus et al. | 422/180 |
| 2009/0274867 A1 * | 11/2009 | Hiramatsu | 428/117 |

FOREIGN PATENT DOCUMENTS

| | | |
|---|---|---|
| JP | A-61-129017 | 6/1986 |
| JP | U-62-179318 | 11/1987 |
| JP | A-1-145378 | 6/1989 |
| JP | U-2-117033 | 9/1990 |

(Continued)

OTHER PUBLICATIONS

May 23, 2012 European Search Report issued in European Patent Application No. 07860267.9.

(Continued)

*Primary Examiner* — Jennifer McNeil
*Assistant Examiner* — Nicholas W Jordan
(74) *Attorney, Agent, or Firm* — Oliff & Berridge, PLC

(57) ABSTRACT

Provided is a honeycomb structure in which as compared with partition walls of an end face side portion of all inlet of a fluid, partition walls of an end face side portion of an outlet of the fluid satisfy at least one of conditions of (1) a heat conductivity being relatively high, (2) a heat capacity being relatively large, (3) a bending strength being relatively high and (4) a porosity being relatively low. In this honeycomb structure, the melting or thermal shock breakdown of the partition walls does not easily occur, and the structure is suitably used as a DPF.

13 Claims, 5 Drawing Sheets

FOREIGN PATENT DOCUMENTS

| | | |
|---|---|---|
| JP | A-7-204431 | 8/1995 |
| JP | A-2003-10616 | 1/2003 |
| JP | A-2003-117320 | 4/2003 |
| JP | A-2004-270569 | 9/2004 |
| JP | A-2006-231116 | 9/2006 |
| JP | A-2006-272157 | 10/2006 |
| WO | WO 02/032545 A1 | 4/2002 |

OTHER PUBLICATIONS

Feb. 22, 2013 Office Action issued in European Patent Application No. 07 860 267.9-1354.

Jan. 29, 2013 Office Action issued in Japanese Patent Application No. 2008-551148 (with translation).

\* cited by examiner

HONEYCOMB STRUCTURE AND METHOD FOR MANUFACTURING THE SAME

This is a Continuation of International Application No. PCT/JP2007/075038, filed Dec. 26, 2007, which claims the benefit of Japanese Patent Applications Nos. 2006-352733, filed Dec. 27, 2006, and 2007-228053, filed Sep. 3, 2007. The disclosure of the prior applications is hereby incorporated by reference herein in its entirety.

TECHNICAL FIELD

The present invention relates to a honeycomb structure in which at least one of heat conductivity, heat capacity, bending strength and porosity of partition walls changes or partially differs in positions of the partition walls, and a method for manufacturing the honeycomb structure.

BACKGROUND ART

To prevent pollution and improve environment, a filter or a catalyst is applied to the treatment of an exhaust gas, and a honeycomb structure is frequently used as the filter itself for the treatment of the exhaust gas or a catalyst carrier. To collect and remove, for example, a particulate matter (PM, detected as three components of organic solvent soluble components, soot and sulfates) included in the exhaust gas from a diesel engine or the like, a diesel particulate filter (DPF) is incorporated and used in an exhaust system of the diesel engine or the like, and the honeycomb structure is used in this DPF.

In a case where the honeycomb structure is used as the DPF, it is to be noted that when the PM is collected and removed (during use) and when the PM deposited in the filter is burnt and removed to suppress the increase of a pressure drop due to the PM deposited in the filter with an elapse of time (during regeneration), a temperature rise easily becomes uneven, and a defect such as a crack is generated by a thermal stress sometimes. Especially in recent years, the DPF has been enlarged, and hence the thermal stress generated during the use and during the regeneration has increased more remarkably than before. The problems of the frequency and degree of the generation of the defect based on the thermal stress become more serious.

On the other hand, there is suggested a honeycomb structure having a structure in which a plurality of honeycomb segments are integrally adhered together by mutual adhesive faces via cement material layers. In such a honeycomb structure, the cement material layers perform a cushion-like function for suppressing thermal expansion, and hence the thermal stress is relaxed. Moreover, by the employment of a segment structure, a distance between a high temperature portion and a low temperature portion shortens, and a temperature gradient decreases. Therefore, the honeycomb structure having the segment structure has an advantage that a defect such as the crack is not easily generated. It is to be noted that examples of a prior document concerning the honeycomb structure having the segment structure include Patent Document 1.

Patent Document 1: JUM-A-2-117033
Patent Document 2: JP-A-1-145378
Patent Document 3: JP-A-7-204431
Patent Document 4: JP-A-2003-10616
Patent Document 5: JP-A-2003-117320

DISCLOSURE OF THE INVENTION

However, even a honeycomb structure having a segment structure causes the melting or thermal shock breakdown of partition walls sometimes, in a case where the structure is used as a DPF. A collected PM burns in order from a fluid inlet side during regeneration, and hence on a fluid outlet side, the burning heat of the PM on the side is added to heat generated at a front portion, and a temperature easily rises as compared with the fluid inlet is side. Therefore, it has been considered that the melting or thermal shock breakdown of the partition walls occurs especially on the fluid outlet side of the honeycomb structure.

Moreover, when the porosity of the honeycomb structure is increased to decrease the pressure drop of the DPF, a heat capacity and a heat conductivity decrease. In this case, there are experienced problems that the temperature rise due to the burning of the PM increases before the increase of the porosity and that the melting or thermal shock breakdown of the partition walls might be caused as compared with a DPF which does not have a high porosity.

The present invention has been developed in view of such a situation, and an object thereof is to provide a honeycomb structure which is useful as an exhaust gas filter or a catalyst carrier, especially as a DPF for collecting a PM included in the exhaust gas of a diesel engine or the like and in which the melting or thermal shock breakdown of partition walls does not easily occur during use and during regeneration.

It is to be noted that examples of a prior document disclosing the invention developed to achieve an object similar to the above object include Patent Documents 2 to 5.

Patent Document 2 suggests a silicon carbide honeycomb structure in which the average pore diameter of open pores having a mesh structure stepwise or continuously decreases from the fluid inlet side to the outlet side. In this silicon carbide honeycomb structure, heat movement, chemical reaction, substance movement or the like generated on partition wall surfaces is effectively performed by the mesh structure. Moreover, the average pore diameter (an average pore size) is decreased from the partition wall-fluid inlet side to the fluid outlet side, whereby the concentrated depositing of soot around the outlet side is suppressed. Moreover, in the silicon carbide honeycomb structure disclosed in Patent Document 2, by such structural characteristics, the burning heat during heating is uniformly generated over the whole partition walls to prevent the melting or thermal shock breakdown of the partition walls. Furthermore, Patent Document 2 discloses means for manufacturing the silicon carbide honeycomb structure having a configuration in which a transition layer forming auxiliary agent of aluminum, boron or the like is present in a formed article (a degreased article) having a honeycomb shape so as to generate a concentration gradient, and the evaporation-re-condensation/surface diffusion of silicon carbide during re-crystallization is changed to control crystal growth, whereby the average pore diameter stepwise or continuously decreases.

Patent Document 3 discloses a filter for a diesel engine exhaust gas, including an inflow-side filter made of a ceramic material synthesized in parallel with the inflow direction of the diesel engine exhaust gas and having a low heat conductivity, and an outflow-side filter made of a ceramic material having a high heat conductivity. Specifically, the heat conductivity of the inflow-side filter is set to 0.04 to 0.19 kcal/mh° C., and the heat conductivity of the outflow-side filter is set to 0.195 to 0.50 kcal/mh° C. The purpose of this filter for the diesel engine exhaust gas is not the suppression of breakdown, but the heat conductivity is set to a small (low) conductivity on the inflow side and a large (high) conductivity on the outflow side, to obtain an effect that the power consumption of an electric heater for igniting the soot is remarkably decreased.

Patent Document 4 suggests a honeycomb structure including honeycomb segments in which the heat capacity of a honeycomb segment outer peripheral side portion is larger than that of a central portion for a purpose of the suppression of crack generation due to the thermal stress during the use. Moreover, as a method for increasing the heat capacity of the outer peripheral side portion, plate installation means made of components having large specific heat is disclosed (claims 5 to 7 of Patent Document 4). Furthermore, the document discloses means for changing the thicknesses of the partition walls in an inclining manner (thickening the partition walls on the outer peripheral side and thinning the partition walls in the center) (claims 8 to 10 of Patent Document 4). Additionally, in the embodiment, the deposited soot (PM) amount and maximum temperature of the honeycomb structure provided with a plate having the same composition are compared with those of a honeycomb structure in which any plate is not installed, to confirm the increase of the limit of the deposited soot (PM) amount that does not cause any damage, and the lowering of the maximum temperature.

Patent Document 5 suggests a honeycomb filter which changes material properties such as the heat conductivities of the honeycomb segments arranged in an outer peripheral portion and the honeycomb segments arranged in the center. The honeycomb filter suggested in Patent Document 5 realizes a honeycomb filter which keeps a low pressure drop and which is excellent in regeneration efficiency and durability. However, the honeycomb segments having different material properties are combined and used. Therefore, the properties can be changed in a diametric direction vertical to a central axis direction, but the properties are the same in all regions in a direction parallel to the central axis. In consequence, there is a problem to be solved that the improvement of the properties (the increasing of the heat capacity and the like) cannot be performed only in a portion where the temperature does not easily rise owing to the soot (PM) burning.

With respect to these prior documents, investigation has been repeated to achieve the above mentioned object of the present invention, and it has been found that a fired honeycomb article is modified with a slurry including fine SiC particles and the like, and at least one of the heat conductivity, heat capacity, bending strength and porosity of the partition walls from a fluid inlet side to an outlet side during the use of the structure as the DPF is changed, preferably continuously or stepwise changed, whereby the problem of the melting or thermal shock breakdown of the partition walls can be solved while keeping the characteristics of the honeycomb structure having a high porosity. Specifically, to achieve the purpose of the solving of the above-mentioned problem, according to the present invention, the following honeycomb structure is provided.

That is, according to the present invention, first, there is provided a honeycomb structure having a honeycomb shape which is a columnar article having two end faces and an outer peripheral surface connecting the two end faces to each other and which includes a plurality of cells as through channels for a fluid formed in parallel between the two end faces and partitioned by partition walls of a porous material, wherein as compared with partition walls of an end face side portion of an inlet of the fluid, partition walls of an end face side portion of an outlet of the fluid satisfy at least one of the following conditions (1) to (4):

(1) a heat conductivity being relatively high;
(2) a heat capacity being relatively large;
(3) a bending strength being relatively high; and
(4) a porosity being relatively low.

The end face side portion of the outlet of the fluid is the portion of a continuous constant region including the end face as the outlet of the fluid, and is simply referred to as the fluid outlet side in the present description. The end face side portion of the inlet of the fluid is the portion of a continuous constant region including the end face as the inlet of the fluid, and is simply referred to as the fluid inlet side in the present description.

In the honeycomb structure according to the present invention, the end face side portion of the outlet of the fluid is preferably a portion of 1/n of the whole article from the end face of the outlet of the fluid in the central axis direction of the columnar article. The value n is larger than 1, and is preferably a natural number larger than 1. Moreover, in this case, n is preferably 2 or more and 10 or less. The portion of 1/n of the whole article from the end face of the outlet of the fluid in the central axis direction of the columnar article is a portion including the end face as the outlet of the fluid, when the honeycomb structure as the columnar article is divided into n portions in the central axis direction of the columnar article. In a preferable configuration of the honeycomb structure according to the present invention, the end face side portion of the inlet of the fluid corresponds to a portion other than the portion of 1/n of the whole article from the end face of the outlet of the fluid in the central axis direction of the columnar article. Furthermore, in other words, it can be considered that the partition walls of the portion of 1/n of the whole article from the end face of the outlet of the fluid in the central axis direction of the columnar article satisfy at least one of the above conditions (1) to (4) as compared with (the partition walls of) the end face side portion of the inlet of the fluid corresponding to the other portion. As long as the partition walls of the portion of 1/n satisfy at least one of the above conditions (1) to (4) as compared with (the partition walls of) the other portion, the heat conductivity, heat capacity, bending strength and porosity of the partition walls of the portion of 1/n of the whole article from the end face of the outlet of the fluid in the central axis direction of the columnar article may be or may not be the same in the region of 1/n.

In the honeycomb structure according to the present invention, the partition walls of a central axis side portion in a diametric direction vertical to the central axis direction of the columnar article preferably satisfy at least one of the above conditions (1) to (4) as compared with the partition walls of an outer peripheral surface side portion in the diametric direction vertical to the central axis direction of the columnar article. The central axis side portion is a portion including the central axis in the vicinity of the central axis, and is a central portion of the constant region in the diametric direction vertical to the central axis direction of the columnar article. As an example of a preferable configuration in the honeycomb structure according to the present invention, in a limited place in the diametric direction of the columnar article, that is, only in the central axis side portion of the honeycomb structure as the columnar article, the end face side portion of the outlet of the fluid (in the central axis direction of the columnar article) satisfies at least one of the above conditions (1) to (4) as compared with the end face side portion of the inlet of the fluid.

In the honeycomb structure according to the present invention, in the partition walls of all the portions in the diametric direction vertical to the central axis direction of the columnar article, that is, irrespective of the place in the diametric direction of the columnar article, even the central axis side portion and outer peripheral surface side portion of the honeycomb structure as the columnar article may similarly satisfy at least one of the above conditions (1) to (4).

In the honeycomb structure according to the present invention, the partition walls preferably satisfy at least one of the following conditions (a) to (d) from the end face side of the inlet of the fluid to the end face side of the outlet of the fluid in the end face side portion of the outlet of the fluid:

(a) a heat conductivity increasing continuously or stepwise;

(b) a heat capacity increasing continuously or stepwise;

(c) a bending strength increasing continuously or stepwise; and (d) a porosity decreasing continuously or stepwise.

In this case, the partition walls preferably satisfy at least one of the above conditions (a) to (d) from the outer peripheral surface side of the columnar article to the central axis side of the columnar article in the end face side portion of the outlet of the fluid. It is to be noted that a direction from the end face side of the inlet of the fluid to the end face side of the outlet of the fluid or from the outer peripheral surface side of the columnar article to the central axis side of the columnar article is a direction related to the conditions (a) to (d), and they are not included in the end face side portion of the outlet of the fluid sometimes.

In the honeycomb structure according to the present inventions the end face side portion of the outlet of the fluid preferably has the surface areas of the partition walls smaller than those of the end face side portion of the inlet of the fluid.

In the honeycomb structure according to the present invention, the opening diameters of the cells on the end face side of the outlet of the fluid are preferably smaller than those on the end face side of the inlet of the fluid.

In the honeycomb structure according to the present invention, the open area ratio of the end face of the outlet of the fluid is preferably smaller than that of the end face of the inlet of the fluid.

In the honeycomb structure according to the present invention, there is not any special restriction on a cell density (the number of the cells per unit area in the section of the columnar article vertical to the central axis direction of the article). However, when the cell density is excessively small, a geometric surface area runs short. When the cell density is excessively large, a pressure drop increases. Therefore, the cell density is preferably about 0.9 to 310 cells/cm$^2$ (6 to 2000 cells/square inch).

In the honeycomb structure according to the present invention, there is not any special restriction on the shape of the section (the section vertical to the central axis direction of the columnar article) of each cell it is possible to use any shape, fox example, a polygonal shape such as a triangular shape, a quadrangular shape or a hexagonal shape, a combination of an octagonal shape and the quadrangular shape, a circular shape, an elliptic shape, a racing track shape or a partially deformed shape of one of these shapes. From the viewpoint of ease of preparation, the cell sectional shape is preferably the triangular shape, the quadrangular shape, the hexagonal shape or the combination of the octagonal shape and the quadrangular shape. In the combination of the octagonal shape and the quadrangular shape, when octagonal cells are disposed on the fluid inlet side, the surface area on the fluid inlet side can be increased, and the amount of soot to be collected can be increased.

In the honeycomb structure according to the present invention, there is not any special restriction on the thicknesses of the partition walls. However, when the partition wall thicknesses are excessively small, the strength of the honeycomb segments runs short. When the partition walls are excessively thick, the pressure drop increases. Therefore, the thicknesses of the partition walls are preferably are in a range of 50 to 2000 µm.

In the honeycomb structure according to the present invention, the shape of the section (the section vertical to the central axis direction of the columnar article) of each of the honeycomb segments constituting the structure may be a quadrangular shape, a partially deformed quadrangular shape, a triangular shape, a hexagonal shape or the like.

The honeycomb structure according to the present invention preferably further comprises plugging portions which plug the openings of the predetermined cells in the end face of the inlet of the fluid and which plug the openings of the remaining cells in the end face of the outlet of the fluid. In this case, the plugging portions are preferably provided in one end (opening) of each of adjacent cells on opposite sides so that each end face has a checkered pattern.

The honeycomb structure including the plugging portions can preferably be used as a filter such as a DPF for collecting and removing a particulate matter (soot) included in an exhaust gas. When, for example, the exhaust gas of an automobile is allowed to flow into the cells from the end face of the honeycomb structure fluid inlet, the exhaust gas passes through the partition walls to enter the adjacent cells, and is discharged from the end face of the outlet. When the exhaust gas passes through the partition walls, the partition walls of the porous material perform the function of the filter, to collect the soot. When the collected soot is deposited on the partition walls, the pressure drop increases, a burden is imposed on an automobile engine, fuel consumption increases, and drivability lowers. Therefore, heating by a heater or the like, or engine control is periodically performed to temporarily raise the temperature of the exhaust gas, whereby the soot is burnt and removed, and the filter function is regenerated. To promote the burning during this regeneration, a catalyst (a metal) may be loaded in the honeycomb structure according to the present invention.

In the honeycomb structure according to the present invention, from the viewpoints of strength and thermal resistance, the partition walls of the porous material are preferably made of a silicon carbide (SiC) material or a silicon-silicon carbide based composite material formed by using silicon carbide (SiC) as an aggregate and silicon (Si) as a combining material.

In the honeycomb structure according to the present invention, as the material of the partition walls, besides the silicon carbide material or the silicon-silicon carbide based composite material, it is possible to employ silicon nitride, cordierite, mullite, alumina, spinnel, a silicon carbide-cordierite based composite material, lithium aluminum silicate, aluminum titanate, an Fe—Cr—Al based metal or the like.

The honeycomb structure according to the present invention preferably has a segment structure including an adhesive honeycomb segment article having a plurality of honeycomb segments integrally adhered together via cement material layers, and an outer peripheral coating layer to coat the peripheral surface of the adhesive honeycomb segment article.

In the present description, a structure including the plurality of honeycomb segments integrally adhered together by mutual adhesive faces via the cement material layers is a segment structure. Moreover, the whole integrally adhesive honeycomb segments are referred to as the adhesive honeycomb segment article. Moreover, the honeycomb segments are also simply referred to as the segments.

Next, according to the present invention, there is provided a method for manufacturing a honeycomb structure, comprising: a first step of obtaining a formed honeycomb article having a honeycomb shape from a clay and firing the formed honeycomb article to obtain a fired honeycomb article; and a second step of coating and infiltrating the predetermined surfaces of the tired honeycomb article with a slurry including particles having diameters smaller than the average pore diameter of a porous material constituting partition walls (of the fired honeycomb article) and thermally treating the article again. The method for manufacturing the honeycomb structure according to the present invention is a method capable of manufacturing the honeycomb structure according to the present invention.

In the method for manufacturing the honeycomb structure according to the present invention, the first step obtains a plurality of fired honeycomb articles. The method further comprises, after the first step and before the second step, a step of adhering the plurality of fired honeycomb articles as honeycomb segments together to obtain an adhesive honeycomb segment article and coating the peripheral surface of the adhesive honeycomb segment article with an outer peripheral coating layer to obtain the fired honeycomb article having a segment structure, the resultant fired honeycomb article being subjected to the second step, or further comprises, after the first step and after subjecting the plurality of fired honeycomb articles to the second step, a step of adhering the plurality of fired honeycomb articles as the honeycomb segments together to obtain an adhesive honeycomb segment article and coating the peripheral surface of the adhesive honeycomb segment article with an outer peripheral coating layer. A preferable configuration of the method for manufacturing the honeycomb structure according to the present invention is a method capable of manufacturing the honeycomb structure according to the present invention having the segment structure.

In the present description, when the method for manufacturing the honeycomb structure according to the present invention is simply referred, a manufacturing target may or may not have the segment structure.

In the method for manufacturing the honeycomb structure according to the present invention, the predetermined surfaces of the fired honeycomb article are preferably the opposite cell forming surfaces of the partition walls forming the cells and the pore inner surfaces in pores of the partition walls of the porous material. In other words, the cell forming surfaces are the surfaces of the partition walls facing the cells as spaces constituting through channels for a fluid. In other words, the pore inner surfaces are the surfaces which do not face any cell and which for the pores present in the partition walls.

In the method for manufacturing the honeycomb structure according to the present invention, the particles (included in the slurry for the manufacturing target which has the segment structure or does not have any segment structure) are preferably made of a silicon carbide (SiC) material. In the present description, the particles made of the silicon carbide (SiC) material are referred to as the fine SiC particles.

In the present description, the holding of the particles having diameters smaller than the average pore diameter of the porous material constituting the partition walls of the honeycomb structure on the predetermined surfaces of the partition walls referred to as the modification or the modifying. Alternatively, it is described that the honeycomb structure is modified (the modification of the honeycomb structure is performed) or that the partition walls are modified (the modification of the partition walls is performed). Moreover, when the predetermined surfaces of the partition walls as modification targets are the pore inner surfaces in the pores of the partition walls, it in described that the pores are modified (the modification of the pores is performed). In this case, since the particles are held by the pore inner surfaces, it is also described that the particles are charged into the pores. Furthermore, the slurry for use in the modification is also referred to as the modification slurry. When the honeycomb structure according to the present invention is obtained, in the stage of the fired honeycomb article, the modification can be realized by coating and infiltrating the predetermined surfaces of the fired honeycomb article with the slurry including the particles having diameters smaller than the average pore diameter of the porous material constituting the partition walls of the fired honeycomb article (charging the slurry) and again performing a thermal treatment (i.e., performing the second step of the method for manufacturing the honeycomb structure according to the present invention).

The modification slurry includes a combining material which combines the particles having diameters smaller than the average pore diameter of the porous material constituting the partition walls with one another and a combining material which combines the particles with particles constituting the partition walls, and the combining materials are preferably diluted with water. When the surfaces are coated with the slurry and the thermal treatment is performed again (after the firing), the particles included in the slurry combine with one another, and the combined particles combine with the particles constituting the partition walls of the honeycomb structure, and are charged into, for example, the pores of the porous material constituting the partition walls. The modification slurry may appropriately include a dispersant or a defoamer.

The modification slurry contains remaining components finally held by (the predetermined surfaces of) the partition walls, and chemically or physically changing components are also included in the remaining components, if they are not removed later. In the honeycomb structure according to the present invention, as the particles (included in the slurry), besides silicon carbide (the fine SiC particles), it is possible to employ a ceramic material selected from the group consisting of silicon nitride, cordierite, mullite, alumina, zirconia, zirconium phosphate, spinel, a silicon carbide-cordierite based composite material, a silicon-silicon carbide composite material, lithium aluminum silicate, aluminum titanate, titania and a combination of them; an Fe—Cr—Al based metal; a nickel based metal; or an inorganic powder material of metal Si or the like. Furthermore, it is possible to use particles included in a wash coating, for example, γ-alumina, ceria, zirconia, ceria based composite oxide, zirconia based composite oxide or the like. Examples of especially preferable particles included in the modification slurry include inorganic particles such as SiC powder, oxide fiber such as aluminosilicate fiber and glass particles.

The combining material of the modification slurry preferably includes a colloidal sol such as a silica sol or an alumina sol, a layered clay compound indicating combining properties when swelling or the like. Specifically, examples of the colloidal sol include colloidal silica, and examples of the layered clay compound include montmorillonite, respectively.

The composition (or the blend ratio) of the modification slurry can vary in accordance with the particles, the type of the combining material, the material of the honeycomb structure (the fired honeycomb article) as the modification target, and pore diameters. The amount of the combining material capable of combining the particles with the partition walls and combining the particles with one another may be included in the modification slurry. Moreover, a plurality of types of particles or particles having different particle diameters may be combined and used.

In the method for manufacturing the honeycomb structure according to the present invention, the average particle diameter of the particles is a size of preferably 2% or more and 60% or less of the average pore diameter of the porous material constituting the partition walls.

When the average particle diameter of the particles is less than 2% of the average pore diameter of the porous material constituting the partition walls, the particles charged into the pores of the partition walls are excessively small with respect to the pore diameters, and eventually the particles cannot sufficiently be charged into the pores. That is, the particles are not held by the inner surfaces of the pores but unfavorably pass through the pores. On the other hand, when the average particle diameter exceeds 60%, the particles charged into the pores of the partition walls are excessively large with respect to the pore diameters, and hence the particles unfavorably cannot be charged into the pores (cannot enter the pores). However even in a case where the average particle diameter exceeds 60%, when the average particle diameter is small as compared with the pore diameters of the partition walls; the particles do not easily enter the pores of the partition walls. However, an operation such as suction or pressure reduction is performed, whereby the slurry including the particles can be used for the modification. In this case, the pore inner surfaces in the partition walls are not modified, and the only cell forming surfaces of the partition walls on one side can be modified.

In general, when the honeycomb structure is used as the DPF, a position where the PM is easily accumulated and the temperature easily rises is a central axis side portion in a diametric direction vertical to the central axis direction of the honeycomb structure (the DPF) as the columnar article. Therefore, in a case where the honeycomb structure having the segment structure is manufactured, when the honeycomb segments as targets are modified, the modified honeycomb segments are preferably adhered and assembled to form the central axis side portion. As described above, when the manufacturing target is the honeycomb structure having the segment structure, unmodified honeycomb segments may be adhered together to obtain an adhesive honeycomb segment article, and then modified. In this case, the modification is performed while an unmodified portion is prevented from coming in contact with the slurry by masking or the like.

In the method for manufacturing the honeycomb structure according to the present invention, as described above, the predetermined surfaces of the fired honeycomb article as the modification target are preferably the opposite cell forming surfaces of the partition walls constituting the cells and the pore inner surfaces in the pores of the partition walls of the porous material. Thus, when the modification of opposite sides of the partition walls (the opposite cell forming surfaces) is performed, the deposition of the PM easily occurs only in the surface layers of the partition walls. Moreover, it is possible to expect an effect that a heat capacity increases as compared with a case where the only one side of the partition walls (the cell forming surfaces on the one side) is modified. However, in general, when the honeycomb structure is used as the DPF, the PM is accumulated only on the one side of the partition walls. Therefore, the modification of the only cell forming surfaces of the partition walls on the one side may be performed. In this case, it is possible to suppress the increase of a pressure drop due to the modification.

In the method for manufacturing the honeycomb structure according to the present invention, the modification of the only partition walls of an end face side portion of an outlet of a fluid is performed, and the modification of another portion (the partition walls of an end face side portion of an inlet of the fluid) is not performed, whereby it is possible to obtain the honeycomb structure in which as compared with the other portion (the partition walls of the end face side portion of the inlet of the fluid), the partition walls of the and face side portion of the outlet of the fluid satisfy at least one of conditions of (1) a heat conductivity being relatively high, (2) a heat capacity being relatively large, (3) a bending strength being relatively high and (4) a porosity being relatively low. Even when the number of modification times for each modification part is changed by, for example, modifying the partition walls of the end face side portion of the outlet of the fluid as much as a plurality of times and modifying the other portion (the partition walls of the end face side portion of the inlet of the fluid) only once, the similar honeycomb structure can be obtained. The modification part is a modification region specified by a constant region in the diametric direction of the honeycomb structure and a constant region in the central axis direction of the honeycomb structure. Moreover, the constant region in the diametric direction of the honeycomb structure is specified by a distance from the central axis and a position, and the constant region in the central axis direction of the honeycomb structure is specified by a distance from the end face of the inlet and a position.

Moreover, in the method for manufacturing the honeycomb structure according to the present invention, for example, the number of the modification times is continuously or stepwise increased from the end face side of the inlet of the fluid to the end face side of the outlet of the fluid in the partition walls of the end face side portion of the outlet of the fluid, whereby it is possible to obtain the honeycomb structure satisfying at least one of conditions of (a) a heat conductivity increasing continuously or stepwise, (b) a heat capacity increasing continuously or stepwise, (c) a bending strength increasing continuously or stepwise and (d) a porosity decreasing continuously or stepwise, from the end face side of the inlet of the fluid to the end face side of the outlet of the fluid in the partition walls of the end face side portion of the outlet of the fluid.

The coating with the modification slurry is the coating of the surfaces with the modification slurry to form a film-like slurry, and there is not any special restriction on coating means. The coating includes a spray process, an immersion process or the like, and may be performed by any means. The means for coating the surfaces with the modification slurry may appropriately be selected in accordance with the particle diameters of the particles included in the modification slurry or the composition of the modification slurry. When the immersion process is used, suction may be performed if necessary. After immersion and sucking-up, air blowing or the like may be performed to remove excessive modification slurry.

Thermal treatment conditions during the modifying may appropriately be determined in accordance with the composition of the modification slurry. When the modification is performed with the modification slurry having the same composition as that of the honeycomb segments, to impart the combining properties, the thermal treatment is necessary on the same conditions as honeycomb segment firing conditions. By the combination of a material such as colloidal silica which develops strength at 700 to 800° C., the thermal treatment at a low temperature can be performed. Moreover, the thermal treatment required for the modification may serve as the thermal treatment of another step (e.g., a thermal treatment for forming an outer peripheral coating layer or the like).

The honeycomb structure according to the present invention is the honeycomb structure having the honeycomb shape which is the columnar article having the two end faces and the outer peripheral surface connecting the two end faces to each other and which includes the plurality of cells as the through channels for the fluid formed in parallel between the two end faces and partitioned by the partition walls of the porous material, wherein as compared with the partition walls of the end face side portion of the inlet of the fluid, the partition walls of the end face side portion of the outlet of the fluid satisfy at least one of conditions of (1) the heat conductivity being relatively high, (2) the heat capacity being relatively large, (3) the bending strength being relatively high and (4) the porosity being relatively low.

Moreover, the honeycomb structure according to the present invention can be prepared by the method for manufacturing the honeycomb structure according to the present invention. Specifically, in the stage of the fired honeycomb article, the modification is performed, and modification conditions are adjusted (the changing of the number of the modification times, the selection of the modification part, the selection of the modification slurry, etc.), whereby the honeycomb structure according to the present invention can be obtained. In consequence, the following effect is derived.

By the method for manufacturing the honeycomb structure according to the present invention, the honeycomb structure according to the present invention (including the honeycomb structure having the segment structure) is modified with the slurry including the fine SiC particles and the like, and prepared by the adjustment of the modification conditions so that the heat conductivity, the heat capacity and the like of the partition walls are brought into desired states on the inlet side and outlet side of the fluid.

Specifically, the partition walls on the outlet side of the fluid in the honeycomb structure (referred to simply as the outlet side of the honeycomb structure, the partition walls on the outlet side or the outlet side, the inlet side is similarly described) are modified with the fine SiC particles (e.g., the fine SiC particles are charged into the pores), whereby the heat conductivity of the modified partition walls on the outlet side can be increased to quickly transmit, from the honeycomb structure, heat generated by the partition walls on the outlet side. In consequence, in the partition walls on the outlet side, the temperature rise due to burning heat is suppressed, and the melting or thermal shock breakdown (of the partition walls) is prevented.

Moreover, when the outlet side of the honeycomb structure is modified with the fine SiC particles (e.g., the fine SiC particles are charged into the pores), the density of the modified partition walls on the outlet side can be increased, and the heat capacity of the partition walls on the outlet side can be increased. Consequently, in the partition walls on the outlet side, the temperature rise due to the burning heat is suppressed, and the melting or thermal shock breakdown (of the partition walls) is prevented.

Furthermore, when the outlet side of the honeycomb structure is modified with the fine SiC particles (e.g., the fine SiC particles are charged into the pores), the bending strength of the modified partition walls themselves on the outlet side can be increased. In consequence, resistance to the thermal shock breakdown (of the partition walls) improves.

In addition, when the outlet side of the honeycomb structure is modified with the fine SiC particles (e.g., the fine SiC particles are charged into the pores), the porosity of the modified partition walls on the outlet side can be decreased. In consequence, even when the structure is used as the DPF to collect the PM, the PM is not easily accumulated on the partition walls on the outlet side, and the PM is deposited with good balance in the central axis direction of the honeycomb structure as the columnar article. Therefore, the generated burning heat does not especially rise on the outlet side, and the burning heat is suppressed, so that the melting or thermal shock breakdown of the partition walls does not easily occur. It is to be noted that by the adjustment of the modification conditions, the porosity can be decreased while keeping the average pore diameter.

According to the method for manufacturing the honeycomb structure according to the present invention, the modification part can be set to an arbitrary position, so that the heat capacity at the arbitrary position of the honeycomb structure can be increased. In consequence, when the structure is used as the DPF, it is possible to easily increase the heat capacity on the outlet side where it is considered that the burning heat might be excessive.

In the honeycomb structure having the segment structure disclosed in, for example, Patent Document 4, a position where the heat capacity can be increased is limited only to the outer peripheral side portion of the honeycomb segments. When a plate is installed, an installation place is limited only to the outer peripheral side of the honeycomb segments. When the thicknesses of the partition walls are changed, the partition walls have an equal thickness in all the regions of the central axis direction of the columnar article.

Moreover, in the honeycomb structure having the segment structure disclosed in Patent Document 5, honeycomb segments having different material properties are combined and used, so that the heat capacity can be increased at the same position of the central axis direction of the columnar article. Therefore, when the honeycomb structure disclosed in the prior document is used as the DPF, the problem of the excessive burning heat on the outlet side could occur. Such a problem can be avoided by the honeycomb structure according to the present invention obtained by the method for manufacturing the honeycomb structure according to the present invention.

DESCRIPTION OF REFERENCE NUMERALS

Figure 1:
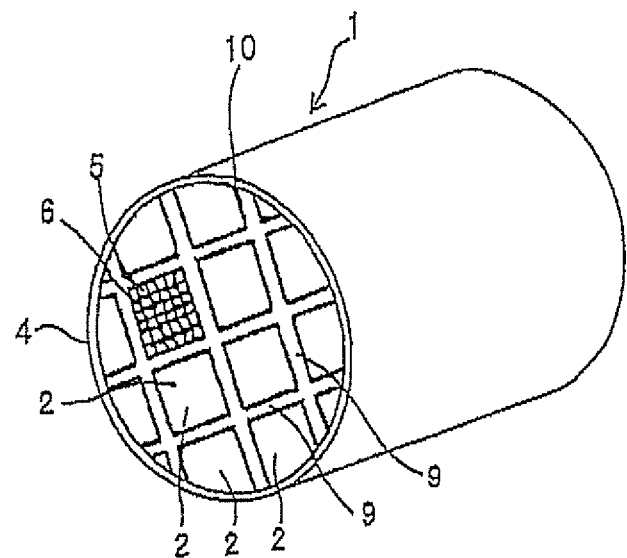
FIG. 1 is a perspective view schematically showing one embodiment of a honeycomb structure (having a segment structure) according to the present invention.

1: honeycomb structure, 2: honeycomb segment, 4: outer peripheral coating layer, 5: cell, 6: partition wall, 7: plugging portion, 8: outer peripheral wall, 9: cement material layer, 10: adhesive honeycomb segment article, 61; SiC crystal particle, 62: metal Si, 63: fine SiC particle, and 64: combining material.

BEST MODE FOR CARRYING OUT THE INVENTION

Hereinafter, embodiments of the present invention will appropriately be described with reference to the drawings, but it should be understood that the present invention is not limited to these embodiments when interpreted. In a range which does not impair the scope of the present invention, various alternations, modifications, improvements or replacements can be added based on the knowledge of any person skilled in the art. For example, the drawings show the preferable embodiments of the present invention, but the present invention is not limited to configurations or information shown in the drawings. To carry out and verify the present invention, means similar or equivalent to means described in the present description can be applied, and the preferable means is means described hereinafter.

Figure 2:
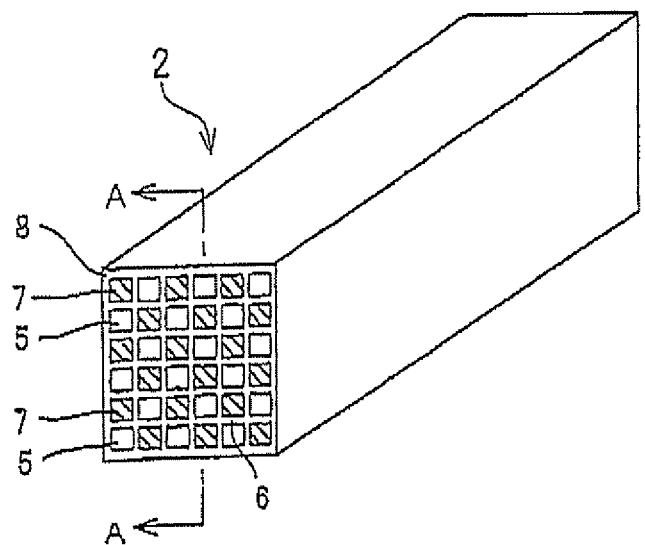
FIG. 2 is a perspective view schematically showing a honeycomb segment constituting the honeycomb structure according to the present invention.
Figure 3:
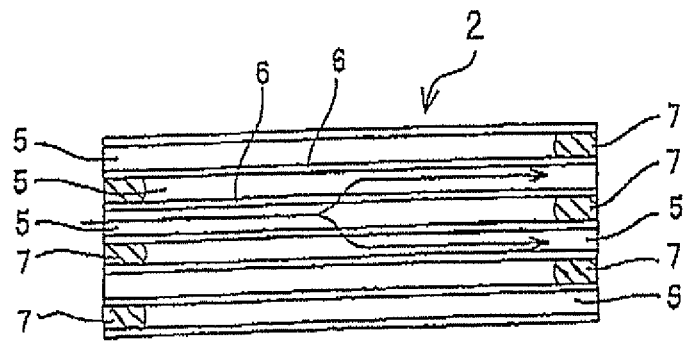
FIG. 3 is a sectional view cut along the A-A line of FIG. 2.
Figure 4:
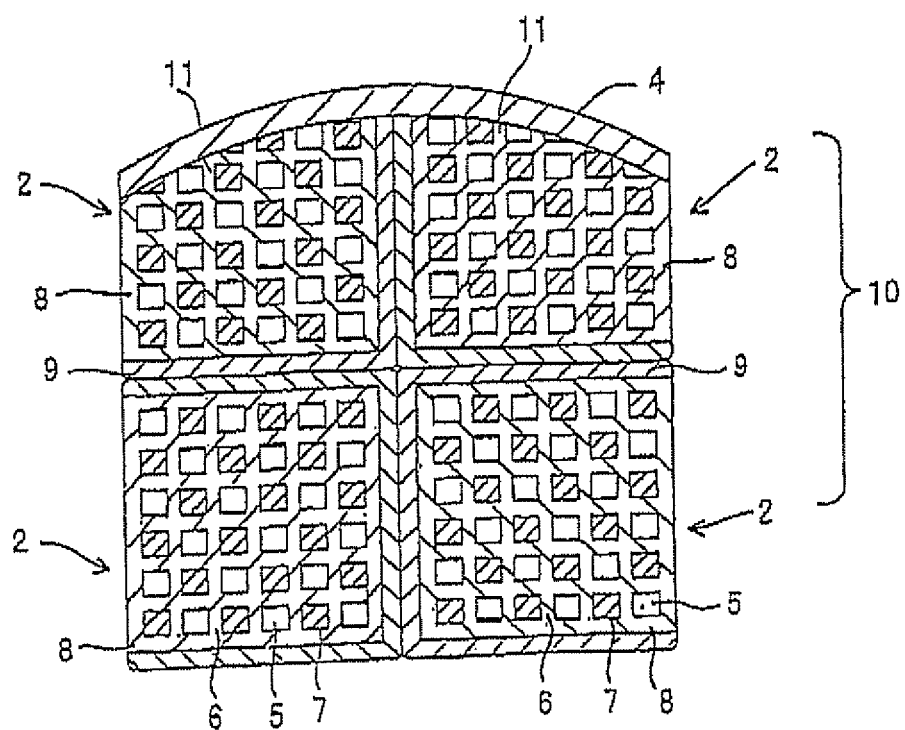
FIG. 4 is a front view of a part of the honeycomb structure shown in FIG. 1 from am end face side.
Figure 5A:
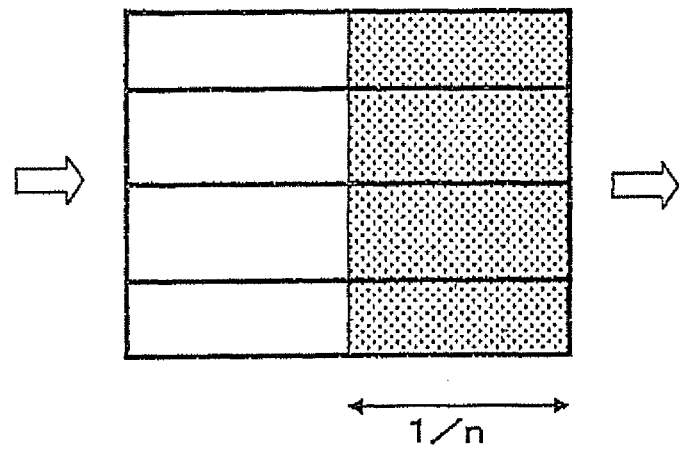
FIG. 5A is a sectional view schematically showing the embodiment of the honeycomb structure (having the segment structure) according to the present invention.

First, a honeycomb structure according to the present invention will be described with reference to FIGS. 1 to 4 and 5A. FIG. 1 is a perspective view schematically showing one embodiment of the honeycomb structure according to the present invention, and FIG. 4 is a front view of a part of the honeycomb structure shown in FIG. 1 from an end face side. FIG. 2 is a perspective view schematically showing a honeycomb segment constituting the honeycomb structure shown in FIG. 1, and FIG. 3 is a sectional view cut along the A-A line of FIG. 2. FIG. 5A is a sectional view schematically showing the embodiment of the honeycomb structure according to the present invention. FIG. 5A shows a modification part and a state such as the heat conductivity of partition walls in the modification part, In FIG. 5A, a portion denoted with 1/n is a portion of 1/n of the whole honeycomb structure from the end face of the honeycomb structure on an outlet side in a central axis direction, and corresponds to the modification part (this also applies to FIGS. 5B to 5F described later). FIG. 5A shows the section of a columnar article parallel to the central axis direction and crossing the central axis. It is to be noted that FIG. 1 shows cells and partition walls in one of honeycomb segments constituting the honeycomb structure. Moreover, in FIG. 5A, arrows show the flow direction of a fluid, the left side is an inlet of the fluid, and the right side is an outlet of the fluid. FIG. 5A only shows the honeycomb segments, and the cells and partition walls are omitted and are not shown.

As shown in FIGS. 1 to 4 and 5A, a honeycomb structure 1 is a columnar article having two end faces and an outer peripheral surface connecting the two end faces to each other, and has a segment structure, and the shape of the section of the whole article cut along a plane vertical to the central axis direction is a circular shape. Between two end faces, a plurality of cells 5 partitioned by porous partition walls 6 made of, for example, silicon carbide are formed in parallel, and entirely form a honeycomb shape. The honeycomb structure 1 includes an adhesive honeycomb segment article 10 in which a plurality of honeycomb segments 2 are integrally adhered together via cement material layers 9, and an outer peripheral coating layer 4 which coats the peripheral surface of the adhesive honeycomb segment article 10.

Each honeycomb segment 2 has a shape of a part of the whole shape of the honeycomb structure 1, and includes a large number of partition walls 6 arranged to form the cells 5, and an outer peripheral wall 8 disposed to surround the partition walls 6. The plurality of honeycomb segments 2 are integrally adhered together by the cement material layers 9 to form the adhesive honeycomb segment article 10, ground so that the shape of the section of the whole article cut along the plane vertical to the central axis direction of the adhesive honeycomb segment article 10 is a circular shape, and then coated with the outer peripheral coating layer 4 to protect the peripheral surface of the articles thereby forming the honeycomb structure 1.

The cells 5 are arranged in parallel in the central axis direction of the honeycomb structure 1, and the ends of the adjacent cells 5 are alternately plugged with plugging portions 7 made of a charging material. Left end portions of the predetermined cells 5 (inflow cells) shown in FIGS. 2 and 3 are opened, whereas right end portions of the cells are plugged with the plugging portions 7. Left end portions of the other cells 5 (outflow cells) adjacent to the inflow cells are plugged with the plugging portions 7, but tight end portions of the cells are opened. By such plugging, as shown in FIGS. 2 and 4, the end faces of the honeycomb segments 2 have a checkered pattern.

When the honeycomb structure 1 is used as a DPF, the structure is disposed in an exhaust system of a diesel engine or the like, whereby a PM including soot discharged from the diesel engine can be collected.

When the honeycomb structure 1 including the plurality of adhesive honeycomb segments 2 is disposed in the exhaust system of an exhaust gas, the exhaust gas flows into the cells 5 from the left side in FIG. 3. FIG. 3 shows a case where the left side of the honeycomb segments 2 (the honeycomb structure 1) is an inlet of a fluid such as the exhaust gas. The exhaust gas flows into the cells 5 (the inflow cells) which are not plugged but are opened. The cells 5 are spaces as through channels for the fluid, and the exhaust gas flowing into the cells 5 (the inflow cells) passes through the partition walls 6 of a porous material to enter the other cells 5 (the outflow cells), and is discharged from the honeycomb segments 2 (the honeycomb structure 1) through the cells. Subsequently, when the exhaust gas passes through the partition walls 6, the PM including the soot in the exhaust gas is collected by the partition walls 6. Thus, the exhaust gas is purified. Moreover, when the PM is collected in this manner, the PM including the soot is deposited in the honeycomb segments 2 (the honeycomb structure 1) with an elapse of time to increase a pressure drop, so that regeneration for burning the PM is periodically performed.

In the honeycomb structure 1, when portions of 1/n of the whole columnar article from the end faces of the partition walls 6 on the outlet side of the fluid in the central axis direction of the columnar article correspond to all portions present in a diametric direction vertical to the central axis direction of the columnar article (the (right) portions on the outlet side of the fluid in FIG. 5A), the portions become a modification part, and as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low. These conditions to be satisfied can be selected in accordance with a manufacturing process. That is, the honeycomb structure 1 is prepared by a method for manufacturing the honeycomb structure according to the present invention described later, and in a second step of the method, modification conditions are adjusted, whereby the honeycomb structure 1 can satisfy one or more selected from the above conditions (1) to (4).

Next, FIGS. 5B to 5G are sectional views schematically showing the other embodiments of the honeycomb structure according to the present invention. FIGS. 5B to 5G show the section of a columnar article parallel to a central axis direction and crossing a central axis in the sane manner as in FIG. 5A, and show a modification part and a state such as the heat conductivity of partition walls in the modification part in each honeycomb structure different from the embodiment of the honeycomb structure 1 shown in FIG. 5A. Even the honeycomb structures of embodiments shown in FIGS. 5B to 5G are prepared by a method for manufacturing the honeycomb structure according to the present invention described later, and in a second step of the method, modification conditions are adjusted, whereby the modification part and a state such as the heat conductivity of the partition walls in the modification part can be obtained as desired.

Figure 5B:
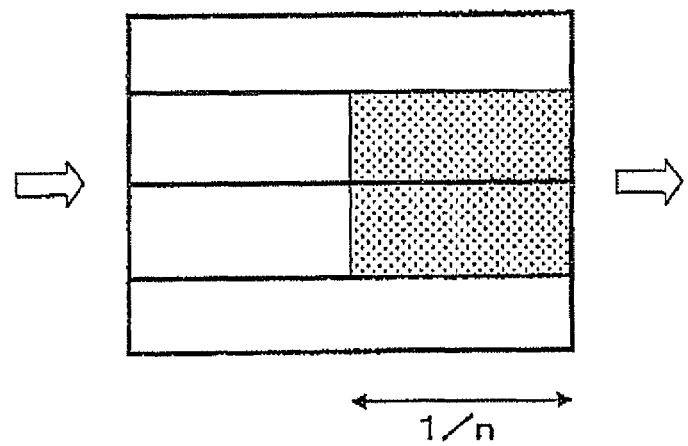
FIG. 5B is a sectional view schematically showing another embodiment of the honeycomb structure (having the segment structure) according to the present invention.

In the honeycomb structure of the embodiment shown in FIG. 5B, when portions of 1/n of the whole columnar article from the end faces of partition walls on the outlet side of a fluid in the central axis direction of the columnar article correspond to central axis side portions in a diametric direction vertical to the central axis direction of the columnar article (the (right) portions on the outlet side of the fluid in FIG. 5B, corresponding to two central honeycomb segments), the portions become a modification part. Moreover, in the honeycomb structure of the embodiment shown in FIG. 5B, as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low.

Figure 5C:
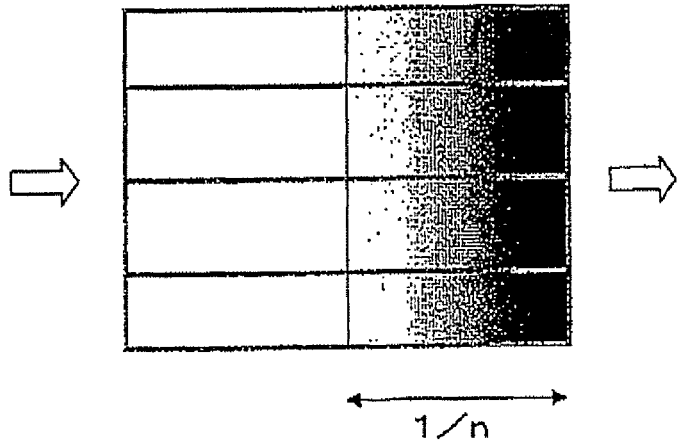
FIG. 5C is a sectional view schematically showing still another embodiment of the honeycomb structure (having the segment structure) according to the present invention.

In the honeycomb structure of the embodiment shown in FIG. 5C, when portions of 1/n of the whole columnar article from the end faces of partition walls on the outlet side of a fluid in the central axis direction of the columnar article correspond to all portions in a diametric direction vertical to the central axis direction of the columnar article (the (right) portions on the outlet side of the fluid in FIG. 5C), the portions become a modification part. Moreover, in the honeycomb structure of the embodiment shown in FIG. 5C, as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low. Moreover, the modification part satisfies at least one of conditions of (a1) a heat conductivity increasing continuously, (b1) a heat capacity increasing continuously, (c1) a bending strength increasing continuously and (d1) a porosity decreasing continuously, from the end face side of an inlet of the fluid (the left side) to the end face side of the outlet of the fluid (the right side). In a second step of a method for manufacturing the honeycomb structure according to the present invention, modification conditions are adjusted, whereby the honeycomb structure can satisfy one or more selected from the above conditions (a1) to (d1). It is to be noted that in FIG. 5c, the gradation of the modification part shows a continuous change.

Figure 5D:
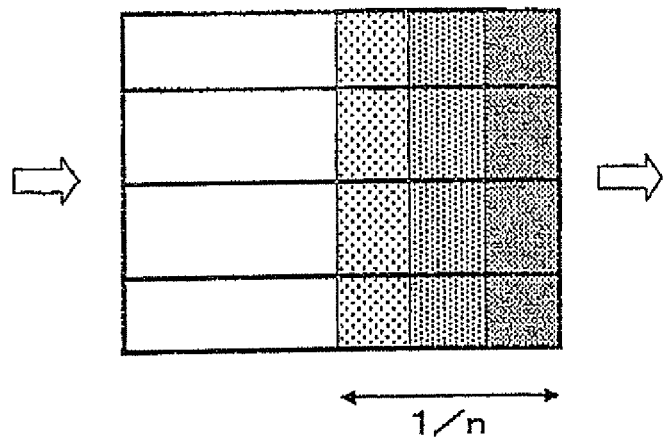
FIG. 5D is a sectional view schematically showing a further embodiment of the honeycomb structure (having the segment structure) according to the present invention.

In the honeycomb structure of the embodiment shown in FIG. 5D, when portions of 1/n of the whole columnar article from the end faces of partition walls on the outlet side of a fluid in the central axis direction of the columnar article correspond to all portions in a diametric direction vertical to the central axis direction of the columnar article (the (right) portions on the outlet side of the fluid in FIG. 5D), the portions become a modification part. Moreover, in the honeycomb structure of the embodiment shown in FIG. 5D, as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low. Moreover, the modification part satisfies at least one of conditions of (a2) a heat conductivity increasing stepwise, (b2) a heat capacity increasing stepwise, (c2) a bending strength increasing stepwise and (d2) a porosity decreasing stepwise, from the end face side of an inlet of the fluid (the left side) to the end face side of the outlet of the fluid (the right side). In a second step of a method for manufacturing the honeycomb structure according to the present invention, modification conditions are adjusted, whereby the honeycomb structure can satisfy one or more selected from the above conditions (a2) to (d2).

Figure 5E:
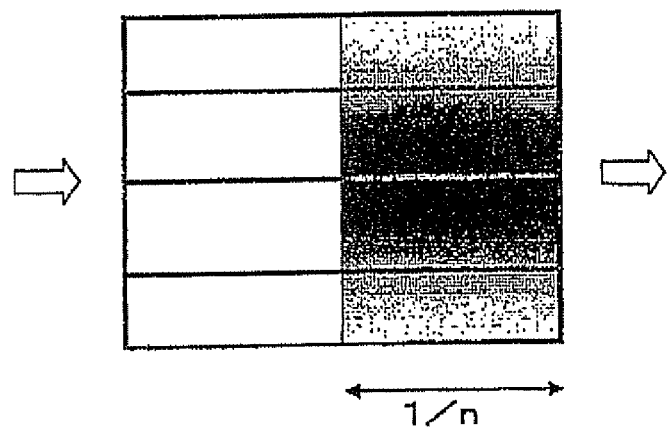
FIG. 5E is a sectional view schematically showing a further embodiment of the honeycomb structure (having the segment structure) according to the present invention.

In the honeycomb structure of the embodiment shown in FIG. 5E, when portions of 1/n of the whole columnar article from the end faces of partition walls on the outlet side of a fluid in the central axis direction of the columnar article correspond to all portions in a diametric direction vertical to the central axis direction of the columnar article (the (right) portions on the outlet side of the fluid in FIG. 5E), the portions become a modification part. Moreover, in the honeycomb structure of the embodiment shown in FIG. 5E, as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low. Moreover, the modification part satisfies at least one of conditions of (a1) a heat conductivity increasing continuously, (b1) a heat capacity increasing continuously, (c1) a bending strength increasing continuously and (d1) a porosity decreasing continuously, from the outer peripheral surface side of the columnar article (the upside and the downside) to the central axis side of the columnar article (the center).

Figure 5F:
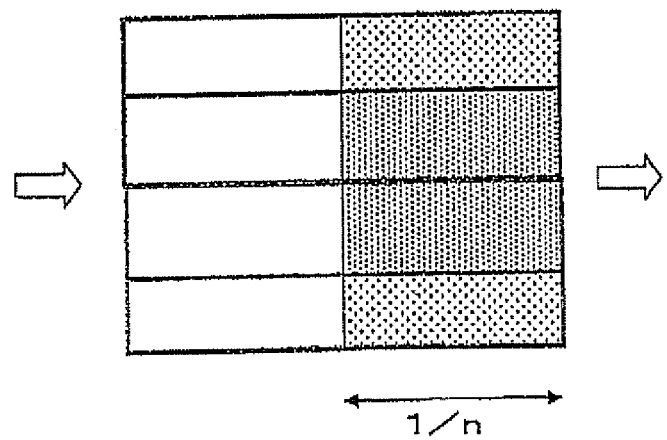
FIG. 5F is a sectional view schematically showing a further embodiment of the honeycomb structure (having the segment structure) according to the present invention.

In the honeycomb structure of the embodiment shown in FIG. 5F, when portions of 1/n of the whole columnar article from the end faces of partition walls on the outlet side of a fluid in the central axis direction of the columnar article correspond to all portions in a diametric direction vertical to the central axis direction of the columnar article (the (right) portions on the outlet side of the fluid in FIG. 5F), the portions become a modification part. Moreover, in the honeycomb structure of the embodiment shown in FIG. 5E, as compared with another portion, the modification part satisfies at least one of conditions of (1) the heat conductivity of the partition walls being relatively high, (2) the heat capacity of the partition walls being relatively large, (3) the bending strength of the partition walls being relatively high and (4) the porosity of the partition walls being relatively low. Moreover, the modification part satisfies at least one of conditions of (a2) a heat conductivity increasing stepwise, (b2) a heat capacity increasing stepwise, (c2) a bending strength increasing stepwise and (d2) a porosity decreasing stepwise, from the outer peripheral surface side of the columnar article (the upside and the downside) to the central axis side of the columnar article (the center). That is, in the honeycomb structure of the embodiment shown in FIG. 5F, as compared with the honeycomb segments on the outer peripheral surface side of the columnar article, the honeycomb segments on the central axis side of the columnar article have a heat conductivity being relatively high, a heat capacity being relatively large, a bending strength being relatively high and a porosity being relatively low.

Figure 5G:
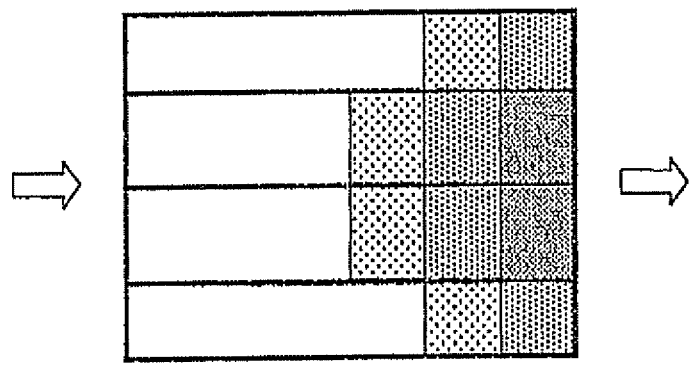
FIG. 5G is a sectional view schematically showing a still further embodiment of the honeycomb structure (having the segment structure) according to the present invention.

The honeycomb structure of the embodiment shown in FIG. 5G satisfies at least one of conditions of (a2) a heat conductivity increasing stepwise, (b2) a heat capacity increasing stepwise, (c2) a bending strength increasing stepwise and (d2) a porosity decreasing stepwise, from the end face side of an inlet of a fluid (the left side) and the outer peripheral surface side of a columnar article (the upside and the downside) to the central axis side of the columnar article (the center) on the end face side of an outlet of the fluid (the right side). In the honeycomb structure of the embodiment shown in FIG. 5G, the fluid inlet side (left side) portions of the partition walls do not become a modification part in the same manner as in the honeycomb structures of the embodiments shown in FIGS. 5B to 5F.

Next, the method for manufacturing the honeycomb structure according to the present invention will be described with respect to an example in which the honeycomb structure 1 is prepared. The method for manufacturing the honeycomb structure according to the present invention is preferable means for manufacturing the honeycomb structure according to the present invention.

To prepare the honeycomb structure 1, first a clay is formed into a honeycomb shape to obtain a plurality of formed honeycomb articles. The clay having plasticity can be obtained by adding a binder such as methyl cellulose, hydroxypropoxyl cellulose, hydroxyethyl cellulose, carboxymethyl cellulose or polyvinyl alcohol to a material such as silicon carbide, a silicon-silicon carbide based composite material, silicon nitride, cordierite, mullite, alumina, spinel, a silicon carbide-cordierite based composite material, lithium aluminum silicate, aluminum titanate or an Fe—Cr—Al based metal, and further adding a surfactant and water as a solvent to the material. As means for forming the honeycomb shape, an extrusion process may be used.

Next, the plurality of formed honeycomb articles are dried with microwaves, hot air or the like, and then fired to obtain a plurality of fired honeycomb articles (sintered articles). Then, the plurality of tired honeycomb articles are treated as the honeycomb segments 2, and the honeycomb segments 2 (the fired honeycomb articles) are adhered together to obtain the adhesive honeycomb segment article 10. Specifically, the peripheral surfaces of the honeycomb segments 2 (the outer surface of the outer peripheral wall 8) are coated with an cement material layer slurry constituting the cement material layers 9, the plurality of honeycomb segments 2 are assembled to obtain a predetermined three-dimensional shape (the whole shape of the honeycomb structure 1), and the assembled honeycomb segments are pressed, heated and then dried. Thus, the plurality of honeycomb segments 2 are integrally adhered together to prepare the adhesive honeycomb segment article 10.

Preferable examples of the material of the cement material layers 9 (the material of the cement material layer slurry to coat the honeycomb segments 2) include a material made of an inorganic fiber, inorganic binder, organic binder and inorganic particles. Specifically, examples of the inorganic fiber include an oxide fiber of aluminosilicate, alumina or the like, and another fiber (e.g., an SiC fiber). Examples of the inorganic binder include silica sol, alumina sol and clay. Examples of the organic binder include polyvinyl alcohol, carboxymethyl cellulose and methyl cellulose. Examples of inorganic particles include ceramic particles of silicon carbide, silicon nitride, cordierite, alumina or mullite.

Next, after grinding the adhesive honeycomb segment article 10 into a predetermined shape as required, the peripheral surface of the article is coated with the outer peripheral coating layer 4, to obtain a fired honeycomb article having a segment structure. Specifically, the peripheral surface of the adhesive honeycomb segment article 10 is coated with the outer peripheral coating layer slurry constituting the outer peripheral coating layer 4 so that the thickness of the outer peripheral coating layer 4 is finally in a range of, for example, 0.1 to 1.5 mm, followed by drying and hardening through a thermal treatment, whereby the peripheral surface of the adhesive honeycomb segment article 10 can be coated with the outer peripheral coating layer 4.

When the fired honeycomb article having the segment structure is obtained, the article is subjected to desired modification, whereby it is possible to obtain the honeycomb structure 1 in which at least one of heat conductivity, heat capacity, bending strength and porosity of the partition walls 6 changes or partially differs in positions of the partition walls 6. As described above, the modification is, for example, the coating of preferably the opposite cell forming surfaces of the partition walls forming the cells and the pore inner surfaces in the pores of the partition walls of the porous material in the fired honeycomb article having the segment structure with the slurry including particles having diameters smaller than the average pore diameter of the porous material constituting the partition walls, followed by the thermal treatment again.

As described above, the modification may be performed with respect to the individual honeycomb segments 2 before adhesion, or may be performed after adhesion the unmodified honeycomb segments 2 together. When the honeycomb segments 2 are modified, the only honeycomb segments 2 disposed at specific positions during the adhesion (e.g., the central axis side portions of the honeycomb structure in the diametric direction where a temperature rise easily occurs) may be modified.

Figure 6:
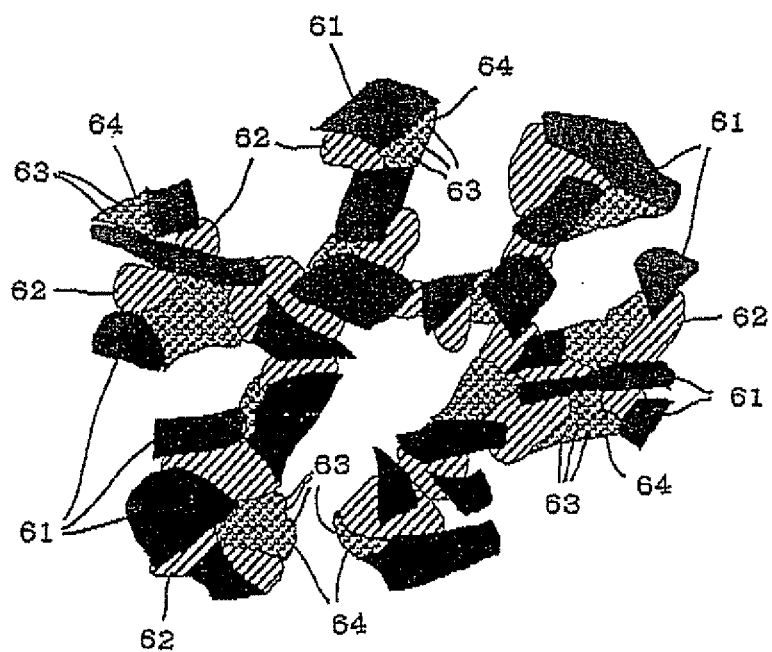
FIG. 6 is a schematic diagram of modified partition walls of the honeycomb structure according to the present invention.

FIG. 6 shows a schematic diagram of the partition walls of the honeycomb structure modified by using the modification slurry including the fine SiC particles and the combining material (colloidal silica). In FIG. 6, remarkably small particles in a combining material 64 are fine SiC particles 63. FIG. 6 shows a structure where by the modification, in pores (pore inner surfaces) of partition walls themselves of a porous material constituted by combining SiC crystal particles 61 with metal Si 62, the fine SiC particles 63 smaller than the SiC crystal particles 61 and metal Si 62 constituting the partition walls are charged and held.

Finally, the cells 5 are plugged. As the material of the plugging portions 7 for use in the plugging, the same material as that of the honeycomb structure 1 (the partition walls 6) may be used. The plugging can be performed by immersing the end face of the honeycomb structure 1 into a plugging slurry constituting the plugging portions 7 while the unplugged cells 5 are masked, and charging the plugging slurry into the opened cells 5. It is to be noted that the plugging slurry constituting the plugging portions 7 may be charged after obtaining the formed honeycomb article and before firing the article When the plugging is performed before the firing, a firing step can be decreased.

EXAMPLES

Hereinafter, the present invention will further specifically be described with respect to examples, but the present invention is not limited by these examples.

Example 1

[Preparation of Fired Honeycomb Article (Honeycomb Segment)] SiC powder and metal Si powder were mixed at a mass ratio of 80:20, and a pore former, an organic binder, a surfactant and water were added to this mixture, to prepare a clay having plasticity. Then, this clay was extruded, and dried to obtain a quadrangular-post-like (columnar) formed honeycomb article having a partition wall thickness of 310 µm, a cell density of about 46.5 cells/cm$^2$ (300 cells/square inch), a square section with one side of 35 mm and a length of 152 mm (in a central axis direction). In this formed honeycomb article, the opposite end faces of the cells were plugged so that the end faces have a checkered pattern. That is, the plugging was performed to alternately plug the opposite ends of the adjacent cells. As a material for the plugging (the material of a plugging slurry to be charged) was use the same material as that of the clay. The opposite end faces of the cells were plugged, dried, and degreased at about 400° C. in the atmosphere, followed by firing at about 1450° C. in an Ar inactive atmosphere, thereby obtaining a fired honeycomb article (a honeycomb segment) having a porous structure in which SiC crystal particles were combined together by Si.

[Physical Properties of Fired Honeycomb Article before modified] When the physical properties of the resultant fired honeycomb article before modified were measured, a heat conductivity was 7-6 W/m·K, a heat capacity was 818 k/m$^3$, a bending strength was 13.8 MPa, a porosity was 54.6%, and an average pore diameter was 22.1 µm.

[Measurement Method of Properties]

The measurement method of the physical properties of the honeycomb structure or the fired honeycomb article (the honeycomb segment) in the example is as follows. The following measurement method was employed even in the measurement of the physical properties of the modified honeycomb structure or fired honeycomb article. A predetermined shape (□10 mm) was cut out from the honeycomb structure or the fired honeycomb article, and the heat conductivity and specific heat were measured with a laser flash heat constant measurement device in conformity to a method described in JIS R1611. The heat capacity of the partition walls per unit volume calculated by multiplying the specific heat by a bulk density. A flat plate having a thickness equal to that of the partition wall was cut out from the honeycomb structure or the fired honeycomb article, and the porosity was measured by Archimedes process. A predetermined shape (0.3×4×40 mm) was cut out from the honeycomb structure or the fired honeycomb article, and the bending strength was measured by a three-point bending test in conformity to JIS R1601. A predetermined shape (□5×15 mm) was cut out from the honeycomb structure or the fired honeycomb article, and the average pore diameter was measured with a mercury porosimeter. An average particle diameter (of the particles in a modification slurry) was measured by using a laser diffraction/scattering type particle diameter distribution measurement device. That is, the particle diameters of the particles in the example are the average particle diameter (see Table 1).

[Preparation of Modification Slurry]

150 parts by mass of SiC particles having particle diameters of 2 µm, 150 parts by mass of colloidal silica (a solution including 40% of solid content) and 200 parts by mass of water were added, and well stirred, to prepare the modification slurry. During the preparation, a dispersant and a defoamer were appropriately added.

[Modification]

The fired honeycomb article was immersed as much as a depth of ½ from the end face of the article as an outlet of a fluid into the resultant modification slurry, and then an excessive slurry was removed by air blowing. Next, the fired honeycomb article was dried, and then thermally treated at 700° C., to obtain the fired honeycomb article in which a portion of ½ (76 mm) in a central axis direction at a position in a region of 76 to 152 nm from an end face as an inlet of the fluid was modified. On the same conditions, 16 fired honeycomb articles (honeycomb segments) were prepared, each article including the modified portion of ½ in the central axis direction.

[Preparation of Honeycomb Structure]

SiC powder as inorganic particles, an aluminosilicate fiber as an oxide fiber, an aqueous silica sol solution as a colloidal oxide and a clay were mixed, water was added to the mixture, and the mixture was kneaded by using a mixer for 30 minutes, to obtain a slurry for cement material layers. Then, the resultant 16 fired honeycomb articles as the honeycomb segments were repeatedly subjected to a step of coating the outer peripheral wall of each honeycomb segment with the cement material layer slurry having a thickness of about 1 mm, thereby forming the cement material layer, and applying another honeycomb segment onto the layer, to prepare a laminated article constituted of a 4×4 combination of the 16 honeycomb segments. Then, an external pressure or the like was appropriately added to the laminated article, and the whole article was adhered together, followed by drying at 120° C. for two hours, whereby an adhesive honeycomb segment article was obtained in which the 16 honeycomb segments were adhered together via the cement material layers. Then, the adhesive honeycomb segment article was cut so as to obtain an outer cylindrical shape, followed by coating with outer peripheral coating layer slurry, drying at 700° C. for two hours and hardening, whereby a honeycomb structure of φ144 mm×152 mm was obtained. On the same conditions, two honeycomb structures were prepared.

[Physical Properties of Modified Honeycomb Structure]

The partition wall of the modified honeycomb structure having a predetermined shape was cut out, and the heat conductivity, heat capacity (specific heat, bulk density), bending strength and porosity were measured. The results are shown in Table 1 together with the configuration of the modification (the corresponding embodiment of the embodiments shown in FIGS. 5A to 5G), the composition of the modification slurry, a ratio between the particle diameters of the particles in the modification slurry and the pore diameters of the partition walls of the honeycomb structure (=the particle diameters/the partition wall pore diameters), the shape during the modification (the modification of the honeycomb segment stage before the adhesion or the modification of the adhesive honeycomb structure) and the modification part. In Table 1, the modification part is specified by the distance from the central axis in the diametric direction of the honeycomb structure, the length in the central axis direction of the honeycomb structure and the position (the distance) from the end face of the inlet).

[Observation of Modification Part]

The partition walls of the modification part of the modified honeycomb structure were observed by using a scanning electron microscope (SEM).

[Preparation of Catalyst-Loaded Honeycomb Structure]

A catalyst slurry was prepared by adding an $Al_2O_3$ sol and a water content to a $\gamma$-$Al_2O_3$ catalyst in which Pt was loaded and $CeO_2$ powder (a co-catalyst). Next, the catalyst slurry was loaded in the modified honeycomb structure by wash coating so that 1.06 g/L of a platinum component was included in the honeycomb structure. Then, after drying, a thermal treatment was performed at 600° C., to obtain a catalyst-loaded honeycomb structure.

[Filter Regeneration Test] A filter regeneration test was performed by using the catalyst-loaded honeycomb structure. A ceramic non-expansible mat as a grasping material was wound around the outer peripheral surface of the catalyst-loaded honeycomb structure, and pushed into a can member for canning made of SUS409, to obtain a canning structure. Afterward, a burning gas including soot generated by the burning of diesel fuel light oil was allowed to flow into the catalyst-loaded honeycomb structure from the end face of the structure at the inlet (the end face on an unmodified side) and flow out from the end face of the outlet (the end face on the modified side), whereby the soot was collected and deposited in the catalyst-loaded honeycomb structure. Next, after once leaving the structure to cool to room temperature, the burning gas including a constant ratio of oxygen at 630° C. was allowed to flow into the catalyst-loaded honeycomb structure from the inlet end face of the structure, to burn and remove the soot. The filter regeneration test was thus carried out, and the catalyst-loaded honeycomb structure was evaluated. The amount of the deposited soot was increased successively as much as 2 g/liter (l) from 6 g/l to 14 g/l, and at each increase, the presence of the generation of the crack of the catalyst-loaded honeycomb structure subjected to the filter regeneration test was confirmed, and a maximum temperature during the regeneration (the burning) was measured. Results are shown in Table 2. In Table 2, a circle indicates that any crack is not generated, a cross indicates that the crack is generated, and the temperature is the maximum temperature during the regeneration.

TABLE 1

| | Configuration of modification | Composition of modification slurry (parts by mass) | | | Particle diameters/ partition wall pore diameters (ratio) | Shape during modification | Modification part(modification region) | | |
|---|---|---|---|---|---|---|---|---|---|
| | | Particles (particle diameters) | Combining material | Water | | | Diametric direction | Central axis direction | Position from inlet end face |
| Example 1 | FIG. 5A | SiC(2 μm) 150 | Colloidal silica 150 | 200 | 0.087 | Honeycomb segment | φ144 mm (the whole diameter) | 76 mm (½) | 76 to 152 mm |
| Example 2 | FIG. 5A | Sic(2 μm) 150 | Colloidal silica 150 | 100 | 0.087 | Honeycomb segment | φ144 mm (the whole diameter) | 76 mm (½) | 76 to 152 mm |
| Example 3 | FIG. 5A | SiC(5.8 μm) 150 | Colloidal silica 150 | 150 | 0.24 | Honeycomb segment | φ144 mm (the whole diameter) | 76 mm (½) | 776 to 152 mm |
| Example 4 | FIG. 5A | SiC(0.5 μm) 150 | Colloidal silica 150 | 100 | 0.022 | Honeycomb segment | φ144 mm (the whole diameter) | 76 mm (½) | 76 to 152 mm |
| Example 5 | FIG. 5A | SiC(13 μm) 150 | Colloidal silica 150 | 100 | 0.58 | Honeycomb segment | φ144 mm (the whole diameter) | 51 mm (⅓) | 101 to 152 mm |
| Example 6 | FIG. 5A | SiC(0.5 μm)75 SiC(5.6 μm)75 | Colloidal silica 150 | 150 | 0.13 | Honeycomb segment | φ144 mm (the whole diameter) | 76 mm (½) | 76 to 152 mm |
| Example 7 | FIG. 5A | SiC(2 μm) 150 | Colloidal silica 150 | 200 | 0.087 | Honeycomb segment | φ144 mm (the whole diameter) | 76 mm (½) | 76 to 152 mm |
| Example 8 | FIG. 5B | SiC(2 μm) 150 | Colloidal silica 150 | 200 | 0.087 | Honeycomb segment | φ100 mm (the whole diameter) | 76 mm (½) | 76 to 152 mm |
| Example 9 | FIg. 5B | SiC(2 μm) 150 | Colloidal silica 150 | 200 | 0.087 | Honeycomb segment | □71 mm (4 control segments) | 76 mm (½) | 76 to 152 mm |
| Example 10 | FIG. 5A | SiC(2 μm) 150 | Colloidal silica 150 | 200 | 0.087 | Honeycomb segment | φ144 mm (the whole diameter) | 30 mm (⅕) | 122 to 152 mm) |
| Example 11 | FIG. 5A | SiC(2 μm) 150 | Colloidal silica 150 | 200 | 0.087 | Honeycomb segment | φ144 mm (the whole diameter) | 15 mm (1/10) | 137 to 152 mm |
| Example 12 | FIG. 5D | SiC(2 μm) 150 | Colloidal silica 150 | 200 | 0.087 | Honeycomb segment Honeycomb segment | φ144 mm (the whole diameter) | 38 mm (¼) 38 mm (¼) | 76 to 114 mm 114 to 152 mm |
| Example 13 | FIG. 5F | SiC(2 μm) 150 SiC(2 μm) 150 | Colloidal silica 150 Colloidal silica 150 | 200 100 | 0.087 0.087 | Honeycomb segment Honeycomb segment | □71 mm (4 control segments) □71 mm Except (4 control segments) | 76 mm (½) 76 mm (½) | 76 to 152 mm 76 to 152 mm |
| Example 14 | FIG. 5G | SiC(2 μm) 150 | Colloidal silica 150 | 200 | 0.087 | Honeycomb segment | □71 mm (4 central segments) □71 mm Except (4 central segments) | 38 mm (¼) 38 mm (¼) 38 mm (¼) | 76 to 114 mm 114 to 152 mm 114 to 152 mm |
| Example 15 | FIG. 5A | Alumina(2 μm) 150 | Colloidal silica 100 | 200 | 0.087 | Honeycomb structure | φ144 mm (the whole diameter) | 76 mm (½) | 76 to 152 mm |
| Example 16 | FIG. 5A | Alumina(2 μm)105 Ceria(2 μm)45 | Alumina sol 100 | 200 | 0.087 | Honeycomb structure | φ144 mm (the whole diameter) | 76 mm (½) | 76 to 152 mm |
| Comparative Example 1 | — | — | — | — | — | — | — | — | — |

TABLE 1-continued

|  | Heat conductivity [w/m·K] | Specific heat [J/(kg·K)] | Bulk density [kg/m³] | Heat capacity [kJ/K/m³] | Bending strength [MPa] | Porosity [%] |
|---|---|---|---|---|---|---|
| Example 1 | 11.3 | 653 | 1725 | 1126 | 18.5 | 40.2 |
| Example 2 | 9.9 | 657 | 1564 | 1028 | 17.0 | 45.8 |
| Example 3 | 10.9 | 655 | 1650 | 1081 | 17.9 | 42.4 |
| Example 4 | 9.4 | 657 | 1497 | 984 | 16.4 | 47.4 |
| Example 5 | 8.9 | 653 | 1435 | 937 | 15.9 | 48.9 |
| Example 6 | 14 | 681 | 2010 | 1329 | 20.3 | 31.4 |
| Example 7 | 11.1 | 653 | 1721 | 1124 | 18.4 | 40.1 |
| Example 8 | 11.1 | 653 | 1721 | 1124 | 18.4 | 40.1 |
| Example 9 | 11.4 | 653 | 1725 | 1126 | 18.6 | 40.2 |
| Example 10 | 11.3 | 653 | 1725 | 1126 | 18.5 | 40.2 |
| Example 11 | 11.3 | 653 | 1725 | 1126 | 18.5 | 40.2 |
| Example 12 | 11.3 | 653 | 1725 | 1126 | 18.5 | 40.2 |
|  | 12 | 657 | 1020 | 1196 | 18.2 | 37.8 |
| Example 13 | 11.3 | 653 | 1725 | 1126 | 18.5 | 40.2 |
|  | 9.9 | 657 | 1554 | 1028 | 17 | 45.8 |
| Example 14 | 11.3 | 653 | 1725 | 1126 | 18.5 | 40.2 |
|  | 12 | 657 | 1820 | 1196 | 19.2 | 37.8 |
|  | 11.3 | 653 | 1725 | 1126 | 18.5 | 40.2 |
| Example 15 | 10.7 | 672 | 1840 | 1235 | 18.7 | 40.5 |
| Example 16 | 10.5 | 665 | 1810 | 1204 | 18.4 | 40.8 |
| Comparative Example 1 | 7.6 | 651 | 1257 | 818 | 13.8 | 54.6 |

TABLE 2

| | Amount of deposited soot [g/L] | | | | |
|---|---|---|---|---|---|
| | 6 | 8 | 10 | 12 | 14 |
| Example 1 | o/780° C. | o/1060° C. | o/1210° C. | o/1290° C. | o/1370° C. |
| Example 2 | o/800° C. | o/1120° C. | o/1300° C. | o/1350° C. | x/1420° C. |
| Example 3 | o/800° C. | o/1120° C. | o/1300° C. | o/1350° C. | x/1390° C. |
| Example 4 | o/810° C. | o/1160° C. | o/1370° C. | x/1420° C. | — |
| Example 5 | o/810° C. | o/1160° C. | o/1350° C. | x/1370° C. | — |
| Example 6 | o/750° C. | o/1010° C. | o/1150° C. | o/1220° C. | o/1310° C. |
| Example 7 | o/780° C. | o/1060° C. | o/1210° C. | o/1290° C. | o/1370° C. |
| Example 8 | o/770° C. | o/1040° C. | o/1170° C. | o/1240° C. | o/1320° C. |
| Example 9 | o/770° C. | o/1040° C. | o/1200° C. | o/1270° C. | o/1340° C. |
| Example 10 | o/790° C. | o/1090° C. | o/1240° C. | o/1300° C. | o/1380° C. |
| Example 11 | o/820° C. | o/1150° C. | o/1330° C. | x/1380° C. | x/1450° C. |
| Example 12 | o/750° C. | o/1020° C. | o/1160° C. | o/1240° C. | o/1320° C. |
| Example 13 | o/740° C. | o/1010° C. | o/1150° C. | o/1230° C. | o/1310° C. |
| Example 14 | o/710° C. | o/980° C. | o/1140° C. | o/1200° C. | o/1300° C. |
| Example 15 | o/760° C. | o/1020° C. | o/1190° C. | o/1220° C. | o/1340° C. |
| Example 16 | o/780° C. | o/1070° C. | o/1200° C. | o/1290° C. | o/1350° C. |
| Comparative Example 1 | o/820° C. | o/1220° C. | x/1340° C. | — | — |

Example 2

A honeycomb structure was prepared by a method similar to Example 1 except that the composition of a modification slurry included 100 parts by mass of water, and the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of particles in the modification slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 3

A honeycomb structure was prepared by a method similar to Example 1 except that the composition of a modification slurry included 150 parts by mass of SIC particles having particle diameters of 5.6 μm, 150 parts by mass of colloidal silica (a solution including 40% of solid content) and 150 parts by mass of water, and the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the modification slurry and the pore diameters of partition walls of the honeycomb structure, a shape during the modification and a modification part. Moreover, the modification part was observed by a method similar to Example 1 Furthermore, a catalyst-loaded honeycomb structure was prepared, and subjected to a filter regeneration test by a method similar to Example 1. Results are shown in Table 2.

Example 4

A honeycomb structure was prepared by a method similar to Example 1 except that the composition of a modification slurry included 150 parts by mass of SiC particles having particle diameters of 0.5 μm, 150 parts by mass of colloidal silica (a solution including 40% of solid content) and 100 parts by mass of water, and the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the modification slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 5

A honeycomb structure was prepared by a method similar to Example 1 except that the composition of a modification slurry included 150 parts by mass of Sic particles having particle diameters of 13 μm, 150 parts by mass of colloidal silica (a solution including 40% of solid content) and 100 parts by mass of water and a modification part was a portion of ⅓ (51 mm) in the central axis direction of a fired honeycomb article (a honeycomb segment), and the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the modification slurry and the pore diameters of partition walls of the honeycomb structure, a shape during the modification and the modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 6

A honeycomb structure was prepared by a method similar to Example 1 except that the composition of a modification slurry included 75 parts by mass of SiC particles having particle diameters of 5.6 μm, 75 parts by mass of SiC particles having particle diameters of 0.5 μm, 150 parts by mass of colloidal silica (a solution including 40% of solid content) and 150 parts by mass of water, and the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the modification slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 7

The stage of a fired honeycomb article (a honeycomb segment) was not modified but a honeycomb structure was prepared and modified. Specifically, 16 fired honeycomb articles were obtained and were not modified, but were used as the honeycomb segments and adhered together to prepare the honeycomb structure. The resultant unmodified honeycomb structure was immersed as much as a depth of ½ from the end face of the structure, and then excessive slurry was removed by air blowing. Next, the honeycomb structure was dried, and subjected to a thermal treatment at 700° C., whereby the honeycomb structure was obtained in which a portion of ½ (76 mm) in a central axis direction at a position in a region of 76 to 152 mm from the end face as an inlet of a fluid was modified. Except this respect, by a method similar to Example 1, the heat conductivity, heat capacity (specific heat, bulk density), bending strength and porosity of the modified honeycomb structure were measured. The results are shown in Table 1 together with the configuration of the modification, the composition of modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 8

In the same manner as in Example 7, the stage of a fired honeycomb article (a honeycomb segment) was not modified but a honeycomb structure was prepared and modified. Furthermore, in Example 8, an only region of ϕ100 mm from the central axis in a diametric direction became a modification part. Specifically, fired honeycomb articles were obtained and were not modified, but were used as the honeycomb segments and adhered together to prepare the honeycomb structure. A masking tape was attached to the end face of the resultant unmodified honeycomb structure so that the only region of ϕ100 m from the central axis in the diametric direction was modified. Afterward, the honeycomb structure was immersed as much as a depth of ½ from the end face of the structure, and then excessive slurry was removed by air blowing. Next, the honeycomb structure was dried, and then subjected to a thermal treatment at 700° C., whereby the honeycomb structure was obtained in which a portion of ϕ100 mm in the diametric direction and ½ (76 mm) in a central axis direction at a position in a region of 76 to 152 mm from the end face as an inlet of a fluid was modified. Except this respect, by a method similar to Example 1, the heat conductivity, heat capacity (specific heat, bulk density), bending strength and porosity of the modified honeycomb structure were measured. The results are shown in Table 1 together with the configuration of the modification, the composition of modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 9

Among 16 fired honeycomb articles (honeycomb segments), only four articles were modified by the same method as Example 1. Then, to prepare a honeycomb structure, the modified four fired honeycomb articles (honeycomb segments) were disposed on a central axis side in a diametric direction (2×2 on the central axis side among 4×4>, and the remaining unmodified 12 fired honeycomb articles (honeycomb segments) were arranged around the modified honeycomb articles. Except this respect, by a method similar to Example 1, the honeycomb structure was prepared. Then, there were measured the heat conductivity, heat capacity (specific heat, bulk density), bending strength and porosity of the honeycomb structure in which the only central axis side in the diametric direction was modified. The results are shown in Table 1 together with the configuration of the modification, the composition of modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 10

A honeycomb structure was prepared by a method similar to Example 1 except that a modification part of a fired honeycomb article (honeycomb segment) was a portion of ⅕ (30 mm) in a central axis direction at a position in a region of 122 to 152 m=from the end face of the article as an inlet of a fluid. As to the modified honeycomb structure, Table 1 shows the configuration of modification, the composition of a modification slurry, a ratio between the particle diameters of particles in the slurry and the pore diameters of partition walls of the honeycomb structure, a shape during the modification and the modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 11

A honeycomb structure was prepared by a method similar to Example 1 except that a modification part of a fired honeycomb article (honeycomb segment) was a portion of 1/10 (15 mm) in a central axis direction at a position in a region of 137 to 152 mm from the end face of the article as an inlet of a fluid. As to the modified honeycomb structure, Table 1 shows the configuration of modification, the composition of a modification slurry, a ratio between the particle diameters of particles in the slurry and the pore diameters of partition walls of the honeycomb structure, a shape during the modification and the modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 12

A fired honeycomb article was immersed as much as a depth of ½ from the end face of the article into a modification slurry, and then an excessive slurry was removed by air blowing. Then, the fired honeycomb article was again immersed as much as a depth of ¼ from the end face of the article into the modification slurry, and then the excessive slurry was removed by the air blowing. Next, the fired honeycomb article was dried, and then subjected to a thermal treatment at 700° C., thereby obtaining the fired honeycomb article in which the number of modification times varied in accordance with a positional region in a central axis direction. On the same conditions, a portion of ½ (76 mm) in the central axis direction at a position in a region of 76 to 152 mm from the end face as an inlet of a fluid was modified once, and a portion of ¼ (38 mm) in the central axis direction at a position in a region of 114 to 152 mm from the end face as the inlet of the fluid was modified twice, whereby 16 fired honeycomb articles (honeycomb segments) were prepared. A position in a region of 0 to 76 mm from the end face as the inlet of the fluid was not modified even once in the same manner as in Example 1. Except these modification conditions, a honeycomb structure was prepared by a method similar to Example 1. Then, as to the honeycomb structure in which the number of the modification times varied in the central axis direction of the structure, the heat conductivity, heat capacity (specific heat, bulk density), bending strength and porosity of each modification part were measured. The results are shown in Table 1 together with the configuration of the modification, the composition of modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2. It is to be noted that the configuration of the modification of Example 12 is shown in FIG. 5D. However, strictly, the embodiment of FIG. 5D corresponds to a configuration in which the modification varies in three stages (the number of the modification times is 1 to 3), whereas in Example 12, the modification varies in two stages (the number of the modification times is 1 or 2).

Example 13

Among 16 fired honeycomb articles, 12 articles were modified by the same method as Example 2. The remaining four articles were prepared and modified by the same method as Example 1. Then, to prepare a honeycomb structure, the four fired honeycomb articles (honeycomb segments) prepared and modified by the same method as Example 1 were disposed on a central axis side in a diametric direction (2×2 on the central axis side among 4×4), and the 12 fired honeycomb articles (honeycomb segments) prepared and modified by the same method as Example 2 were arranged around the four articles. Except this respect, by a method similar to Example 1, the honeycomb structure was prepared. Then, there were measured the heat conductivity, heat capacity (specific heat, bulk density), bending strength and porosity of the honeycomb structure in which modification conditions varied on the central axis side in the diametric direction and on an outer peripheral surface side. The results are shown in Table 1 together with the configuration of the modification, the composition of modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 14

Among 16 fired honeycomb articles, four articles were prepared and modified by the same method as Example 12, and the number of modification times varied in accordance with a positional region in a central axis direction. The remaining 12 articles were immersed as much as a depth of ¼ from an end face of each article into the same modification slurry as that of Example 1, and then excessive slurry was removed by air blowing, followed by drying. Afterward, the articles were subjected to a thermal treatment at 700° C., prepared and modified. In the 12 fired honeycomb articles, a portion of ¼ (38 mm) in the central axis direction at a position in a region of 114 to 152 mm from the end face as an inlet of a fluid was modified. Then, to prepare a honeycomb structure, the four fired honeycomb articles (honeycomb segments) prepared and modified by the same method as Example 12 were disposed on a central axis side in a diametric direction (2×2 on the central axis side among 4×4), and the remaining 12 fired honeycomb articles (honeycomb segments) were arranged around the four articles. Except this respect, by a method similar to Example 1, the honeycomb structure was prepared. In this honeycomb structure, modification conditions vary on the central axis side in the diametric direction and on an outer peripheral surface side, and the number of the modification times varies in the central axis direction. Results of the measurement of the heat conductivity, heat capacity (specific heat, bulk density), bending strength and porosity of this honeycomb structure are shown in Table 1 together with the configuration of the modification, the composition of a modification slurry, a ratio between the particle diameters of particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2. It is to be noted that the configuration of the modification of Example 14 is shown in FIG. 5G. However, strictly, in the embodiment of FIG. 5G, the modification on the central axis side varies in three stages (the number of the modification times is 1 to 3) and the modification on the outer peripheral surface side varies in two stages (the number of the modification times is 1 or 2), whereas in Example 14, the modification an the central axis side varies in two stages (the number of the modification times is 1 or 2) and the modification on the outer peripheral surface side varies in one stage (the number of the modification times is 0 or 1, i.e., the modification is performed or not).

Example 15

The composition of a slurry for modification included 150 parts by mass of alumina particles having particle diameters of 2 μm, 100 parts by mass of colloidal silica (a solution including 40% of solid content), and 200 parts by mass of water. Moreover, the stage of a fired honeycomb article (honeycomb segment) was not modified, but a honeycomb structure was prepared and modified. Specifically, 16 fired honeycomb articles were obtained and were not modified, but were used as the honeycomb segments and adhered together to prepare the honeycomb structure. The resultant unmodified honeycomb structure was immersed as much as a depth of ½ from the end face of the structure, and then excessive slurry was removed by air blowing. Next, the honeycomb structure was dried, and then subjected to a thermal treatment at 700° C., whereby the honeycomb structure was obtained in which a portion of ½ (76 mm) in a central axis direction at a position in a region of 76 to 152 mm from the end face as an inlet of a fluid was modified. Except this respect, by a method similar to Example 1, the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Example 16

The composition of a slurry for modification included 105 parts by mass of alumina particles having particle diameters of 2 μm, 45 parts by mass of ceria particles having particle diameters of 2 μm, 100 parts by mass of alumina sol (a solution including 20% of solid content), and 200 parts by mass of water. Moreover, the stage of a fired honeycomb article (honeycomb segment) was not modified, but a honeycomb structure was prepared and modified. Specifically, 16 fired honeycomb articles were obtained and were not modified, but were used as the honeycomb segments and adhered together to prepare the honeycomb structure. The resultant unmodified honeycomb structure was immersed as much as a depth of ½ from the end face of the structure, and then excessive slurry was removed by air blowing. Next, the honeycomb structure was dried, and then subjected to a thermal treatment at 700° C., whereby the honeycomb structure was obtained in which a portion of ½ (76 mm) in a central axis direction at a position in a region of 76 to 152 mm from the end face as an inlet of a fluid was modified. Except this respect, by a method similar to Example 1, the heat conductivity, heat capacity (specific heat, bulk density), bending strength and porosity of the modified honeycomb structure were measured. The results are shown in Table 1 together with the configuration of the modification, the composition of the modification slurry, a ratio between the particle diameters of the particles in the slurry and the pore diameters of partition walls of the honeycomb structure, a shape during the modification and a modification part. Moreover, the modification part was observed by a method similar to Example 1. Furthermore, a catalyst-loaded honeycomb structure was prepared, and subjected to a filter regeneration test by a method similar to Example 1. Results are shown in Table 2.

Comparative Example 1

A honeycomb structure was not modified. Except this respect, by a method similar to Example 1, a heat conductivity, heat capacity (specific heat, bulk density), bending strength and porosity were measured. The results are shown in Table 1. Moreover, an (unmodified) catalyst-loaded honeycomb structure was prepared, and subjected to a filter regeneration test by a method based on Example 1. Results are shown in Table 2.

(Consideration)

It can be confirmed from Examples 1 to 16 shown in Table 1 that by the modification, the heat conductivity, heat capacity and bending strength of the modification part increase. It can also be confirmed that the porosity decreases.

Furthermore, according to the observation results of the partition walls of the modification part, the modified states of the partition walls vary in accordance with the particle diameters of used SiC, and the comparatively small particles (having particle diameters of 0.5 μm, 2 μm and 5.6 μm) are charged into the pores of the partition walls, but slightly large particles (having particle diameters of 13 μm) indicate a constitution in which the modified particles are present only on one side of the partition walls (the surface (the cell forming surface) of each cell unplugged during the modification that comes in contact with the modification slurry). That is, it can be confirmed that when the material for use is selected, in addition to the region to be modified, the place to be modified (the one side of the partition walls (the cell forming surfaces) only) can be selected.

In addition, as the material of the modification, SiC having a plurality of particle diameters may be used. In this case, gaps among large particles can be filled with finer particles, thereby achieving an effect such as the increase of the heat capacity (Example 6).

It is seen from Table 2 that in the modified honeycomb structures obtained in Examples 1 to 16, as compared with the unmodified conventional honeycomb structure (Comparative Example 1), the limit of the amount of the deposited soot, which does not cause any damage, increases, and the maximum temperature lowers. Moreover, in a case where the modification part is the center at the diametric direction, unlike another case, the maximum temperature during the burning lowers. This is because in the modified central axis side portion in the diametric direction, the porosity lowers, and the pressure drop increases, so that the soot is easily collected by the unmodified portion (the external portion from the modified central axis side portion). In consequence, the soot is uniformly deposited in the diametric direction, which supposedly causes uniform soot burning and lowers the maximum temperature.

INDUSTRIAL APPLICABILITY

A honeycomb structure according to the present invention is usable as a filter for an exhaust gas. The structure can be utilized as, for example, a diesel particulate filter (DPF) for collecting and removing a particulate matter (PM) included in the exhaust gas from a diesel engine or the like.

The invention claimed is:

1. A honeycomb structure having a honeycomb shape which is a columnar article having two end faces and an outer peripheral surface connecting the two end faces to each other and which includes a plurality of cells as through channels for a fluid formed in parallel between the two end faces and partitioned by partition walls of a porous material,
wherein at least in a central axis side of the columnar article, as compared with partition walls of an end face side portion of an inlet of the fluid, partition walls of an end face side portion of an outlet of the fluid satisfy at least one of the following conditions (1) to (4):
(1) a heat conductivity being relatively high;
(2) a heat capacity being relatively large;
(3) a bending strength being relatively high; and
(4) a porosity being relatively low; and
wherein the end face side portion of the outlet of the fluid is a portion of 1/n of the whole structure from the end face of the outlet of the fluid in the central axis direction of the columnar article, the value n is 2 or more and 10 or less, and wherein only the end face side portion of the outlet or a portion of the article comprising the end face side portion of the outlet is coated with a modification slurry, the modification slurry including SiC particles having an average particle diameter that is 2% or more and 60% or less of the average pore diameter of the porous material of the partition walls.

2. The honeycomb structure according to claim 1, wherein the partition walls of the central axis side portion in a diametric direction vertical to the central axis direction of the columnar article satisfy at least one of the conditions (1) to (4) as compared with the partition walls of an outer peripheral surface side portion in the diametric direction vertical to the central axis direction of the columnar article.

3. The honeycomb structure according to claim 1, wherein the partition walls satisfy at least one of the following conditions (a) to (d) from the end face side of the inlet of the fluid to the end face side of the outlet of the fluid in the end face side portion of the outlet of the fluid:
(a) a heat conductivity increasing continuously or stepwise;
(b) a heat capacity increasing continuously or stepwise;
(c) a bending strength increasing continuously or stepwise; and
(d) a porosity decreasing continuously or stepwise.

4. The honeycomb structure according to claim 3, wherein the partition walls satisfy at least one of the condition (a) to (d) from the outer peripheral surface side of the columnar a article to the central axis side of the columnar article in the end face side portion of the outlet of the fluid.

5. The honeycomb structure according to claim 1, wherein the end face side portion of the outlet of the fluid has surface areas of the partition walls smaller than those of the end face side portion of the inlet of the fluid.

6. The honeycomb structure according to claim 1, wherein the opening diameters of the cells on the end face side of the outlet of the fluid are smaller than those on the end face side of the inlet of the fluid.

7. The honeycomb structure according to claim 1, wherein the open area ratio of the end face of the outlet of the fluid is smaller than that of the end face of the inlet of the fluid.

8. The honeycomb structure according to claim 1, further comprising
plugging portions which plug the openings of the cells in the end face of the inlet of the fluid and which plug the openings of the remaining cells in the end face of the outlet of the fluid.

9. The honeycomb structure according to claim 1, wherein the partition walls of the porous material are made of a silicon carbide (SiC) material or a silicon-silicon carbide based composite material formed by using silicon carbide (SiC) as an aggregate and silicon (Si) as a combining material.

10. The honeycomb structure according to claim 1, which has a segment structure including an adhesive honeycomb segment article having a plurality of honeycomb segments integrally adhered together via cement material layers, and an outer peripheral coating layer to coat the peripheral surface of the adhesive honeycomb segment article.

11. A method for manufacturing the honeycomb structure according to claim 1, comprising:
a first step of obtaining a formed honeycomb article having a honeycomb shape from a clay and firing the formed honeycomb article to obtain a fired honeycomb article; and
a second step of coating and infiltrating predetermined surfaces of the fired honeycomb article with said slurry and thermally treating the article again.

12. The method for manufacturing the honeycomb structure according to claim 11, wherein the first step obtains a plurality of fired honeycomb articles,
the method further comprising, after the first step and before the second step, a step of adhering the plurality of fired honeycomb articles as honeycomb segments together to obtain an adhesive honeycomb segment article and coating the peripheral surface of the adhesive honeycomb segment article with an outer peripheral coating layer to obtain the fired honeycomb article having a segment structure, the resultant fired honeycomb article having the segment structure being subjected to the second step, or the method father comprising, after the first step and after subjecting the plurality of fired honeycomb articles to the second step, a step of adhering the plurality of fired honeycomb articles as the honeycomb segments together to obtain an adhesive honeycomb segment article and coating the peripheral surface of the adhesive honeycomb segment article with an outer peripheral coating layer.

13. The method for manufacturing the honeycomb structure according to claim 11, wherein the predetermined surfaces of the fired honeycomb article are the opposite cell forming surfaces of the partition walls forming the cells and the pore inner surfaces in pores of the partition walls of the porous material.

* * * * *